(12) United States Patent
Garofalo et al.

(10) Patent No.: US 12,227,098 B2
(45) Date of Patent: Feb. 18, 2025

(54) AUTOMATED ELECTRIC VEHICLE CHARGING STATION

(71) Applicant: ND Industries, Inc., Clawson, MI (US)

(72) Inventors: Michael F. Garofalo, Birmingham, MI (US); Richard M. Wallace, Birmingham, MI (US); James P. DeFillipi, Leonard, MI (US)

(73) Assignee: H.B. FULLER COMPANY, St. Paul, MN (US)

( * ) Notice: Subject to any disclaimer, the term of this patent is extended or adjusted under 35 U.S.C. 154(b) by 519 days.

(21) Appl. No.: 17/696,556

(22) Filed: Mar. 16, 2022

(65) Prior Publication Data

US 2022/0348097 A1     Nov. 3, 2022

Related U.S. Application Data

(60) Provisional application No. 63/182,228, filed on Apr. 30, 2021.

(51) Int. Cl.
| | | |
|---|---|---|
| *B60L 53/35* | (2019.01) | |
| *B60L 53/16* | (2019.01) | |
| *B60L 53/30* | (2019.01) | |
| *H02J 7/00* | (2006.01) | |

(52) U.S. Cl.
CPC ............ *B60L 53/35* (2019.02); *B60L 53/16* (2019.02); *B60L 53/305* (2019.02); *H02J 7/0042* (2013.01); *H02J 7/0047* (2013.01)

(58) Field of Classification Search
CPC ........ B60L 53/35; B60L 53/16; B60L 53/305; B60L 2250/10; B60L 53/14; B60L 53/36; B60L 53/37; H02J 7/0042; H02J 7/0047; H02J 7/00034; Y02T 10/70; Y02T 10/7072; Y02T 90/12; Y02T 90/14; Y02T 90/16
USPC ....................................................... 320/104
See application file for complete search history.

(56) References Cited

U.S. PATENT DOCUMENTS

| | | | |
|---|---|---|---|
| 5,461,298 A | 10/1995 | Lara et al. | |
| 7,999,506 B1 | 8/2011 | Hollar et al. | |
| 8,384,344 B1 | 2/2013 | Rogers | |
| 8,853,999 B2 * | 10/2014 | Haddad | B60L 53/35 320/109 |

(Continued)

FOREIGN PATENT DOCUMENTS

EP     2757657 A1 *    7/2014    .......... B60L 11/1838

*Primary Examiner* — M Baye Diao

(57) ABSTRACT

An automated electric vehicle charging station. The charging station can include a frame to which a vehicle can park in proximity to receive an electric charge. The frame is at least partially underneath the vehicle. The charging station can include an alignment indicator and a charging indicator to alert an occupant of the vehicle to a vehicle alignment status and a vehicle charging status. When the vehicle is parked in a charging position, an electronic charging unit automatically determines a receiving location on the vehicle where the vehicle can receive an electric charge. A charging plug can be stored in the frame and can be actuated out of the frame and travel in multiple directions to the receiving location. Electric charge can then be transferred from the charging plug to the vehicle. When the vehicle is finished charging, the charging plug can be actuated to return to the frame.

20 Claims, 8 Drawing Sheets

(56) References Cited

U.S. PATENT DOCUMENTS

| | | | |
|---|---|---|---|
| 8,917,056 B2 * | 12/2014 | Jung | H02J 50/10 |
| | | | 320/108 |
| 9,126,490 B2 | 9/2015 | Cook et al. | |
| 9,463,706 B2 * | 10/2016 | Bell | B60L 53/12 |
| 9,649,948 B2 | 5/2017 | Bell et al. | |
| 9,701,212 B2 | 7/2017 | Baarman et al. | |
| 9,925,883 B2 | 3/2018 | Bell et al. | |
| 10,052,962 B2 | 8/2018 | Dunger et al. | |
| 10,099,569 B2 | 10/2018 | Lindemann et al. | |
| 10,106,045 B2 | 10/2018 | Beattie, Jr. et al. | |
| 10,124,686 B2 | 11/2018 | Namou et al. | |
| 10,245,966 B2 | 4/2019 | Jones et al. | |
| 10,286,793 B2 | 5/2019 | Paryani et al. | |
| 10,399,445 B2 | 9/2019 | Yellambalase et al. | |
| 10,457,158 B2 | 10/2019 | Namou et al. | |
| 10,696,174 B2 | 6/2020 | McGrath et al. | |
| 10,759,298 B2 | 9/2020 | Wang et al. | |
| 10,814,736 B2 | 10/2020 | Van Wiemeersch et al. | |
| 10,850,633 B2 | 12/2020 | Haddad et al. | |
| 11,318,857 B2 * | 5/2022 | Westfall | H01R 13/60 |
| 12,043,137 B2 * | 7/2024 | Kinomura | B60L 53/36 |
| 2012/0286730 A1 | 11/2012 | Bonny | |
| 2013/0029595 A1 | 1/2013 | Widmer et al. | |
| 2013/0338820 A1 * | 12/2013 | Corbett | B60L 53/14 |
| | | | 320/109 |
| 2016/0046194 A1 * | 2/2016 | Tsukamoto | B60L 53/124 |
| | | | 307/104 |
| 2016/0352113 A1 | 12/2016 | Zhao et al. | |
| 2017/0291498 A1 | 10/2017 | Gerfast et al. | |
| 2019/0039466 A1 | 2/2019 | Jung et al. | |
| 2019/0204369 A1 | 7/2019 | Lafontaine et al. | |
| 2019/0248245 A1 | 8/2019 | Golgiri et al. | |
| 2019/0315246 A1 | 10/2019 | Li et al. | |
| 2019/0381910 A1 | 12/2019 | Akhavan-Tafti | |
| 2020/0009982 A1 | 1/2020 | Kim | |
| 2020/0177026 A1 | 6/2020 | Sosinov et al. | |
| 2020/0180448 A1 | 6/2020 | Boecker et al. | |
| 2020/0189413 A1 | 6/2020 | Fagan | |
| 2020/0251929 A1 | 8/2020 | Partovi | |
| 2020/0290476 A1 * | 9/2020 | Brok | B60L 53/66 |
| 2020/0353839 A1 | 11/2020 | Tarchinski et al. | |
| 2020/0391595 A1 | 12/2020 | Sarkar et al. | |
| 2020/0406767 A1 | 12/2020 | Booth et al. | |
| 2021/0023955 A1 | 1/2021 | Schieß et al. | |
| 2021/0053451 A1 | 2/2021 | Bailey et al. | |
| 2022/0324347 A1 * | 10/2022 | Kinomura | G01C 21/3469 |

* cited by examiner

AUTOMATED ELECTRIC VEHICLE CHARGING STATION

BACKGROUND OF THE INVENTION

The present invention relates to electric vehicle ("EV") charging stations. Specifically, to automated electric vehicle charging stations.

As EVs have gained more popularity, the need for EV charging stations has increased. Traditional EV charging stations operate similarly to gas fueling stations. The driver of the vehicle parks in proximity to the charging station and then must exit the vehicle to engage a plug with the vehicle. Some EV charging stations incorporate some form of wireless power where the EV contains a receiver and the charging station contains a transmitter and transfers power to the vehicle through the coupling between the receiver and transmitter. However, this requires such EVs to have the same or similar charging configuration for the receiver and transmitter to align within the constraints of the charging station. The potential for misalignment is great, even with a standardized charging configuration, due to the errors introduced by each driver as they move the vehicle toward the charging station.

Additionally, the increased desire for convenience and focus on sanitation for high-touch surfaces have made traditional fueling stations, electric or otherwise, less appealing. A fuel pump is a high-touch surface that people are inclined to avoid contact with where possible. The necessity for the driver to leave the car to plug in the cord also can be undesirable. For example, in inclement weather or late at night, at an outside charging station, the driver typically is not motivated to exit their vehicle to initiate a charging operation.

SUMMARY OF THE INVENTION

An automated charging station for electric vehicles is provided.

In one embodiment, an automated EV charging station can include a frame and an electronic charging unit mounted in the frame. A driver can park a vehicle in need of an electric charge in proximity to the frame.

In another embodiment, an alignment indicator and/or a charging indicator can be within the field of view of an occupant of the vehicle, such as the driver, to indicate to the occupant whether the vehicle is properly aligned with the automated electric vehicle charging station such that the vehicle can receive power from the charging station and whether the vehicle is charging.

In still another embodiment, the electronic charging unit can include a power supply, a charging plug coupled to the power supply, an actuator, an alignment sensor, a charging sensor, and a controller. The actuator can move the charging plug out of or relative to the frame and toward the vehicle. If the vehicle is properly aligned with the charging station, the actuator can move the charging plug to couple to the vehicle and establish a connection through which the vehicle can receive an electric charge. After the vehicle receives a predetermined amount of electric charge, the actuator can move the charging plug to retract away from the vehicle and to return the charging plug to the frame.

In yet another embodiment, the automated electric vehicle charging station can determine whether a vehicle is in a location sufficient to receive an electric charge and can indicate that determination to the occupant of the vehicle. The charging station can determine a receiving location where the particular vehicle can receive an electric charge. After the charging station determines the receiving location, the charging station can automatically move the charging plug toward the vehicle to couple with the vehicle at the receiving location. The charging station can transfer electric charge to the vehicle through the coupling of the charging plug and the vehicle, automatically disconnect the charging plug from the receiving location, and automatically move the charging plug back to its starting location.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

An automated EV charging station according to various embodiments is described herein. The term "electric vehicle" or "EV" as used throughout this disclosure relates to both fully electric vehicles and hybrid vehicles which are partially powered by electric power. These vehicles may be configured to be wholly or partially controlled or operated by an occupant or a driver, or they may be configured as autonomous vehicles.

Figure 1:
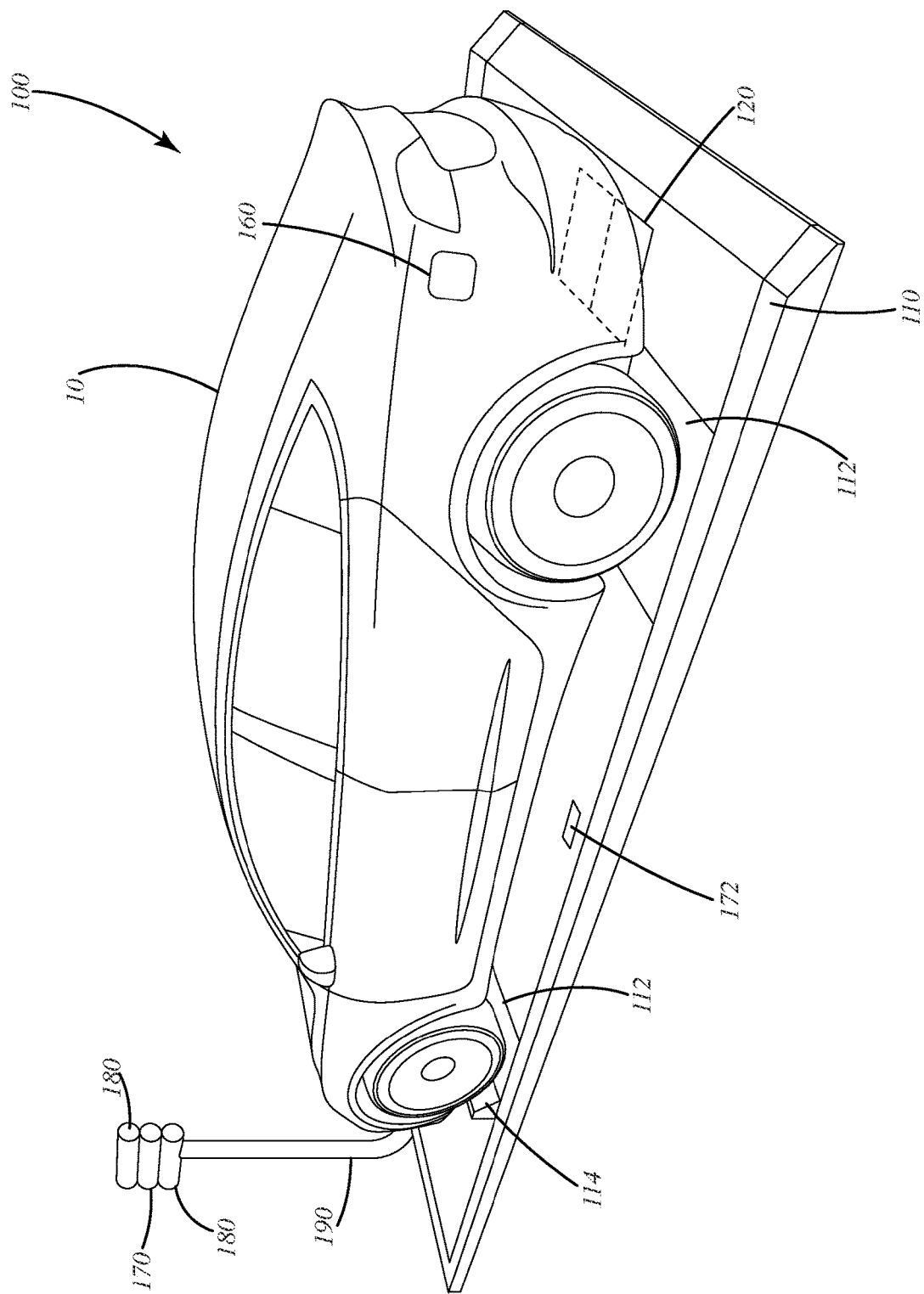
FIG. 1 is a perspective view of an automated electric vehicle charging system with an electric vehicle according to a current embodiment.

In FIG. 1, an automated EV charging station 100 according to one embodiment is shown. The automated EV charging station 100 can include a frame 110 with an electronic charging unit 120 mounted in the frame 110. The frame 110 can have a variety of configurations. For example, in the depicted embodiment, the frame 110 can be a platform which a vehicle 10 can drive onto and park on to receive an electric charge. The platform can be a load-bearing platform that supports the entire weight of the vehicle 10. In other embodiments, the frame 110 can be U-shaped, consist of bumpers 114 that interact with the vehicle 10, consist of a ground plane with protrusions extending from the ground plane, or any other suitable configuration. In one embodiment, the frame 110 can be made from an "all weather" material, meaning the frame 110 can be resistant to wear from environmental factors. Additionally, or alternatively, the frame 110 can include a set of adjustable tire guides 112. The set of adjustable tire guides 112 can provide a recess for the tires of the vehicle 10 to sit in and can assist in correctly aligning the vehicle 10 with the frame 110. Additionally, or alternatively, the frame 110 can include a set of bumpers 114 positioned ahead of the desired position of the front tires of vehicle 10. When the front tires of the vehicle 10 come into contact with the set of bumpers 114, the vehicle 10 is aligned with the frame 110. In an alternative embodiment, the vehicle 10 is aligned with the frame 110 when the vehicle 10 reverses into position and the back tires of the vehicle 10 come into contact with the bumpers 114.

Figure 2:
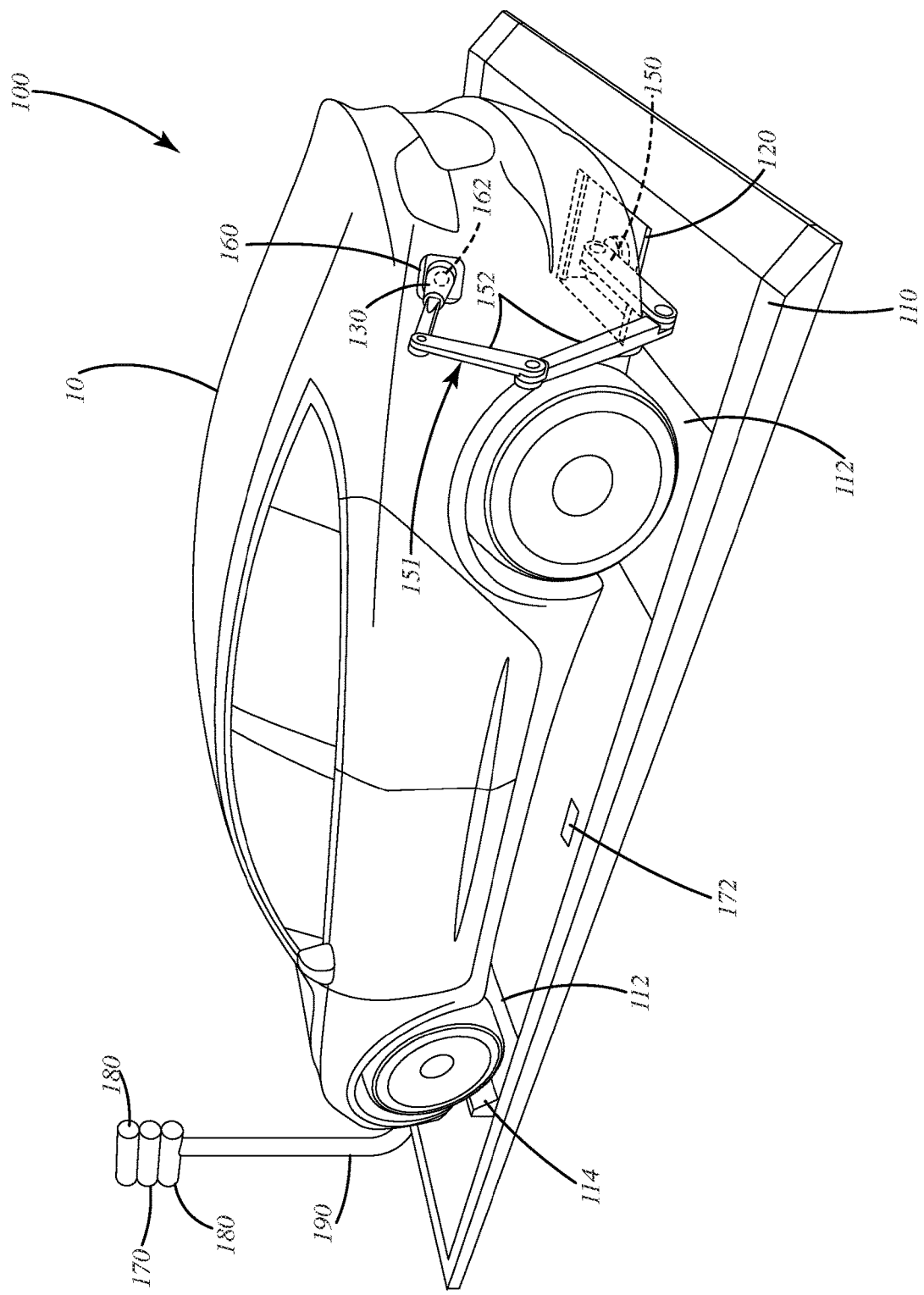
FIG. 2 is a perspective view of the automated electric vehicle charging system with a charging plug actuated to connect to the electric vehicle.

The electronic charging unit 120 can include various electrical components for charging the vehicle 10. The electronic charging unit 120 can include a power supply for providing the power to the vehicle 10. As shown in FIG. 2, a charging plug 130 can be coupled to the power supply through a cord 140 to facilitate providing power to the vehicle 10. The charging plug 130 can be coupled to an actuator 150 through a robotic arm 151 which may be comprised of one or more armatures 152. The actuator 150 can be coupled to a controller and can move the plug 130 relative to the frame 110 in multiple directions and out of the frame 110 to connect with the vehicle 10 at a receiving location 160. The electronic charging unit 120 determines the receiving location 160 through a destination locator 162 in electronic communication with the controller. In one embodiment, the destination locator 162 may be an image capturing device, such as a camera, that may capture images of the vehicle 10 and send those images to the controller. The controller may then analyze the images to determine the location of a charging port and may actuate the charging plug 130 to that location. In one embodiment, the receiving location 160 is a socket that the charging plug 130 inserts into. In another embodiment, the receiving location 160 is the location of a wireless power receiver in the vehicle 10. When the charging plug 130 is connected to the vehicle 10, the charging plug 130 establishes an electrical connection with the vehicle 10 to provide electric charge to the vehicle 10 thereby. In one embodiment, the controller determines the receiving location 160 using a camera with object recognition, a sensor, or some other mechanism. The controller can determine the receiving location 160 as a set of x-, y-, and z-coordinates and communicate that determination to the actuator 150.

The charging plug 130 can be connected to the vehicle 10 in response to a variety of conditions. For example, the charging plug 130 can be automatically connected to the vehicle 10 when the system determines that the vehicle 10 is in a charging position. Additionally, or alternatively, the charging plug 130 can be automatically connected to the vehicle 10 after the occupant of the vehicle 10 sends a signal to the charging station indicating a desire to charge the vehicle 10. The signal can also indicate to the charging station an amount to charge the vehicle 10. For example, the signal can indicate a desire to charge the vehicle fully, charge the vehicle for a certain amount of time, or charge the vehicle an amount corresponding to a desired payment amount.

Figure 8:
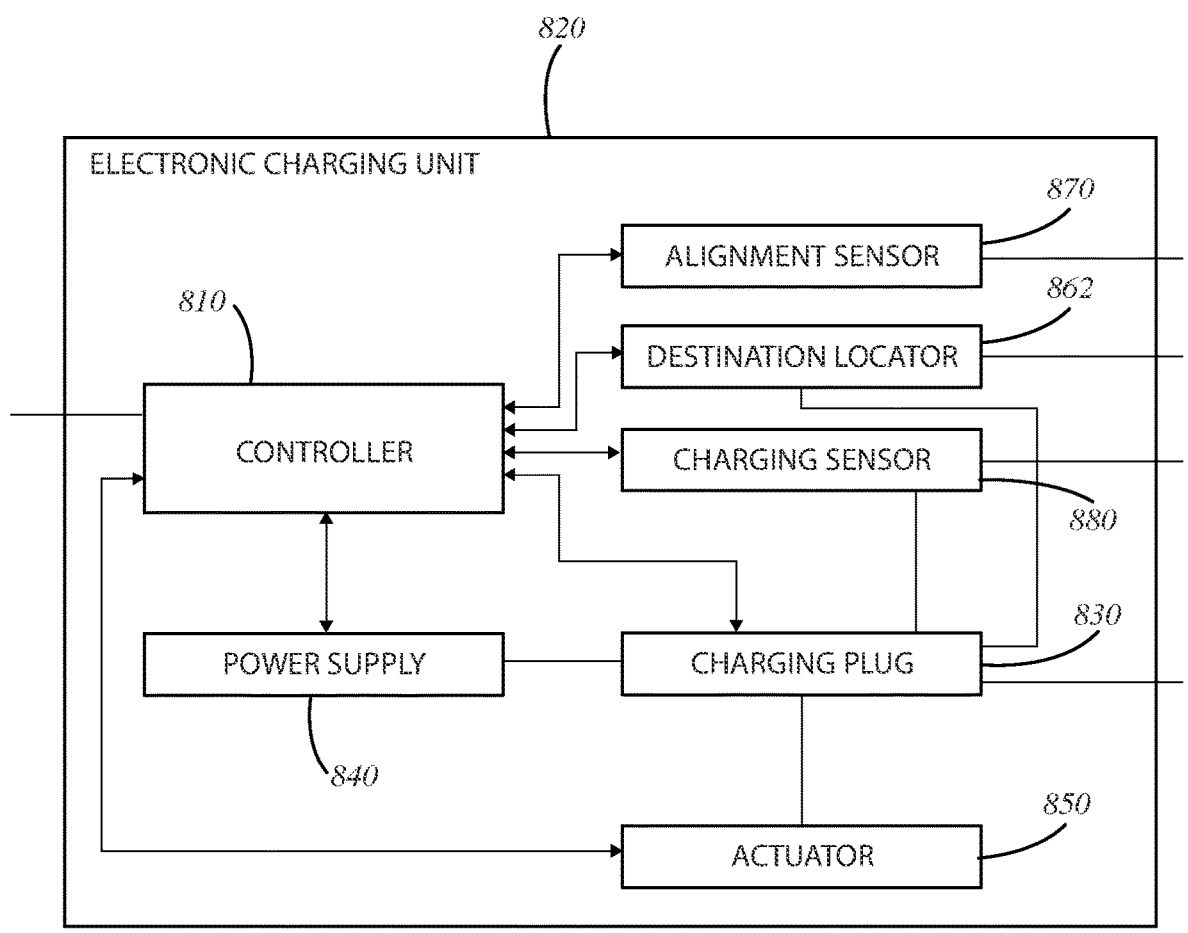
FIG. 8 is a schematic illustrating components of the electronic charging unit.

One embodiment of an electronic charging unit 820 is shown in FIG. 8. The electronic charging unit 820 can include a controller 810, a charging plug 830, a power supply 840, an actuator 850, an alignment sensor 870, a charging sensor 880, and a destination locator 862. In alternative embodiments, the electronic charging unit 820 can only have the alignment sensor 870 or only have the charging sensor 880. As depicted, the controller 810 is in electronic communication with the alignment sensor 870, the charging sensor 880, the destination locator 862, the charging plug 830, the power supply 840, and the actuator 850. As depicted, the charging plug 830 is physically connected to the power supply 840, the actuator 850, the destination locator 862. and the charging sensor 880. In one embodiment, the charging plug 830 and the power supply 840 are connected through a charging cord. The charging sensor 880 can be incorporated within the charging plug 830. Additionally, or alternatively, the charging sensor 880 and the charging plug 830 can be electrically connected. In one embodiment, the destination locator 862 may be incorporated within the charging plug 830. Additionally, or alternatively, the destination locator 862 and the charging plug 830 may be electrically connected. In one embodiment, the power supply 840 can be perpetually on such that power is always available from the charging plug 830 and electric charge is instantly transferred to the vehicle once the charging plug 830 is connected to the vehicle. In another embodiment, the controller 810 can switch the power supply 840 on and off to selectively make power available at the charging plug 830.

Figure 3:
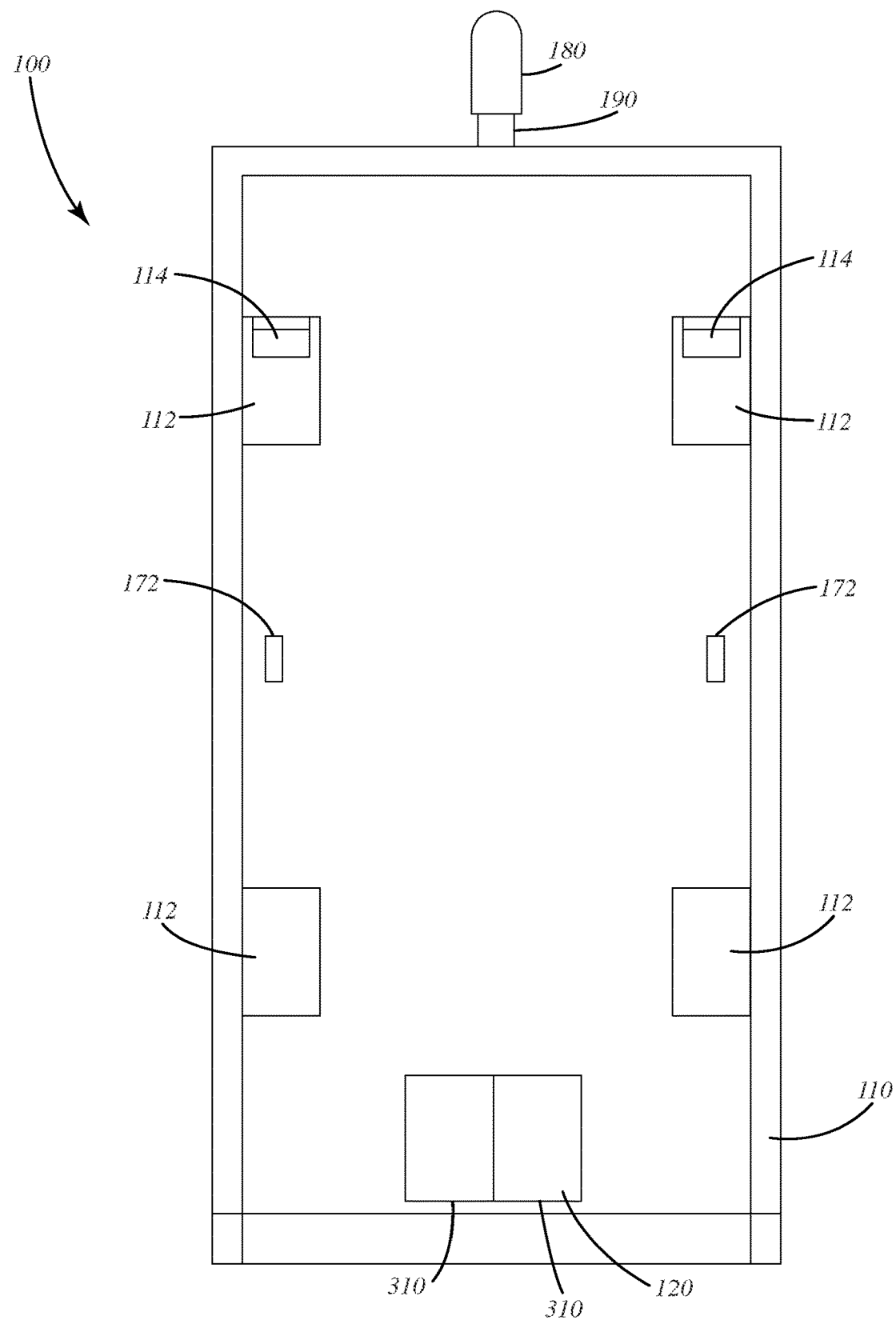
FIG. 3 is a top view of the automated electric vehicle charging system.

As shown in FIGS. 1-3, an alignment sensor 172 and a charging sensor can be coupled to the controller in the electronic charging unit 120. The alignment sensor 172 can alternatively be referred to as a position sensor. As depicted in FIGS. 1-3, the alignment sensor 172 is disposed along the edge of the frame 110 on the top surface of the frame 110. However, the alignment sensor 172 can be disposed anywhere in the frame 110. In an embodiment where the frame 110 includes the set of adjustable tire guides 112, the alignment sensor 172 can be coupled to the tire guides 112 to determine whether a tire is present in the tire guides 112 and can communicate that determination to the controller. In one embodiment, the charging sensor can be disposed in the charging plug 130. The charging sensor can determine whether an electric charge is transferred to the vehicle 10 through the charging plug 130 and communicate that determination to the controller. In one embodiment, the charging sensor can be a current sensor. Additionally, or alternatively, the charging sensor can be a voltage sensor, or any other sensor suitable for measuring the electrical connection between the charging plug 130 and the vehicle 10.

The frame 110 can include an alignment indicator 170 and a charging indicator 180. The alignment indicator 170 can also be referred to as a position indicator. In one embodiment, the alignment indicator 170 and the charging indicator 180 are mounted within a field of view of an occupant of the vehicle 10. The alignment indicator 170 can be electronically connected to the alignment sensor 172 and the charging indicator 180 can be electronically connected to the charging sensor. Additionally, or alternatively, both the alignment indicator 170 and the charging indicator 180 can be electronically connected to the controller. The alignment indicator 170 can indicate to the occupant of the vehicle 10 whether the vehicle 10 is properly aligned with the frame 110 such that the vehicle 10 is in a charging position. The charging indicator 180 can indicate to the occupant of the vehicle 10 a charging status of the vehicle. For example, the charging status can be that the vehicle 10 is not charging, the vehicle 10 is currently being charged, or the vehicle 10 is done charging. Both the alignment indicator 170 and the charging indicator 180 communicate with the occupant of the vehicle 10 without the occupant having to exit the vehicle 10. In one embodiment, the alignment indicator 170 and the charging indicator 180 can be positioned forward of a B pillar of the vehicle 10. In one embodiment, the charging station can have only an alignment indicator or only a charging indicator. Once the vehicle 10 is finished charging, the actuator 150 moves the charging plug 130 to retract from the vehicle 10 and return to the frame 110.

When the vehicle 10 is aligned with the frame 110, the vehicle 10 is in a charging position. In one embodiment, the charging position can be one specific location such that the controller knows the exact footprint of the vehicle 10 with respect to the frame 110. In another embodiment, the charging position can be a variety of positions within a certain range of the electronic charging unit 120 such that the charging plug 130 can reach the receiving location 160.

Figure 7:
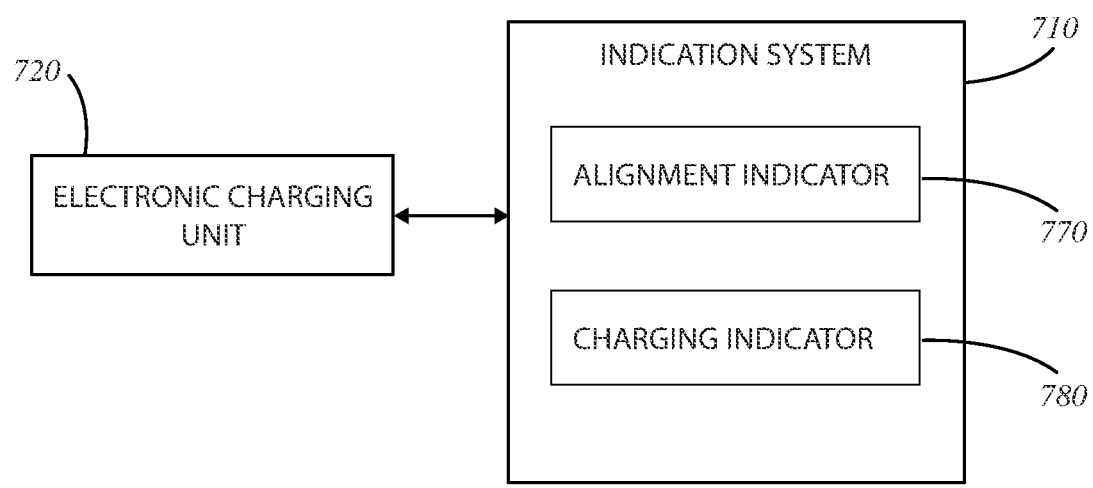
FIG. 7 is a schematic illustrating a connection between an electronic charging unit and an indication system.

In FIG. 7, an illustration of the connection between an electronic charging unit 720 and an indication system 710 according to one embodiment is shown. The electronic charging unit 720 can be electrically connected to the indication system 710. Signals can be passed in both directions across the electrical connection. The indication system 710 can include an alignment indicator 770 and a charging indicator 780. The alignment indicator 770 and the charging indicator 780 can indicate to the occupant of the vehicle a vehicle alignment status and a vehicle charging status in any suitable way. For example, the alignment indicator 770 and the charging indicator 780 can be LEDs in the field of view of the occupant of the vehicle. In another embodiment, the vehicle alignment status and the vehicle charging status can be indicated through an auditory signal. In one embodiment, the indication system 710 can include only one indicator that either indicates the vehicle alignment status, the vehicle charging status, or both the vehicle alignment status and the vehicle charging status. The electronic charging unit 720 can include an alignment sensor, a charging sensor, and a controller. The controller can receive a signal from the alignment sensor and/or the charging sensor and can forward the signal to the indication system 710. The indication system 710 can then indicate to the occupant of the vehicle the vehicle alignment status and the vehicle charging status.

The indication system 710 can be placed in the field of view of an occupant of the vehicle. In one embodiment, the indication system 710 can be incorporated into an infotainment system of the vehicle. Additionally, or alternatively, the indication system 710 can be incorporated into a mobile application on the occupant's mobile phone.

In one embodiment, there can be two charging indicators 180 and one alignment indicator 170. The indicators can be stacked as shown in FIGS. 1-2 such that the alignment indicator 170 is located between the two charging indicators 180. The indicators as shown can be a series of light-emitting diode ("LED") indicators. In one example indication sequence, the top charging indictor 180 can light up when there is no charge connection, e.g., the automated EV charging station is off. The alignment indicator 170 can light up when the vehicle 10 is in the charging position. Both charging indicators 180 can light up to indicate the vehicle 10 is currently charging. Finally, the bottom charging indicator 180 can light up to indicate the vehicle 10 is finished charging. In one embodiment, the top charging indicator 180 can be a red LED, the alignment indicator can be a yellow LED, and the bottom charging indicator 180 can be a green LED.

In the depicted embodiment of FIGS. 1-2, the alignment indicator 170 and the charging indicator 180 are mounted atop a protrusion 190 extending from the front of the frame 110 as an integral portion of the frame 110. In an alternative embodiment, the alignment indicator 170 and the charging indicator 180 can be mounted on a surface around the frame 110 and can be connected to the electronic charging unit 120 wirelessly. In yet another alternative embodiment, the alignment indicator 170 and the charging indicator 180 can be displayed on a mobile device of the occupant of the vehicle 10 or an infotainment system of the vehicle 10.

In one embodiment, the frame 110 can include a "ready to leave" indicator which indicates to the occupant of the vehicle 10 that the charging cycle is complete and the charging plug 130 has been successfully actuated to return to its position in the frame 110.

In one embodiment, the charging plug 130 is connected to an armature 152 which in turn is joined with the frame 110. The armature 152 can move the plug 130 to connect to the vehicle 10. The actuator and/or the armature can be capable of moving the charging plug in three directions. The actuator and/or the armature can move the charging plug in at least two directions.

Returning to FIG. 8, when the vehicle parks in proximity to the frame of the automated EV charging station, the alignment sensor 870 can determine whether the vehicle is properly aligned with the frame such that the vehicle is in a charging position and transmit that determination to the controller 810. If the vehicle is in the charging position, the controller 810 can determine a receiving location on the vehicle where the vehicle is capable of receiving an electric charge. The controller 810 can then automatically cause the actuator 850 to move the charging plug 830 to electrically couple to the vehicle at the receiving location. If the power supply 840 is not already on, the controller 810 can then turn the power supply 840 on and cause the vehicle to be charged. In an alternative embodiment, the controller 810 can wait to cause the actuator 850 to move the charging plug 830 to the vehicle until the controller 810 receives a signal from the occupant of the vehicle to charge the vehicle. If the power supply 840 is not already on, the controller 810 can then turn the power supply 840 on and cause the vehicle to be charged. In yet another embodiment, the controller 810 can automatically cause the actuator 850 to move the charging plug 830 to the receiving location but wait to turn on the power supply 840 until the controller 810 receives a signal from the occupant of the vehicle to charge the vehicle.

The charging sensor 880 can determine whether the charging plug 830 is transferring power to the vehicle and transmit that determination to the controller 810. The controller 810 can then cause the charging indicator to indicate to the occupant of the vehicle whether the vehicle is charging. If the charging sensor 880 signals that the charging plug 830 is not transferring power to the vehicle but the power supply 840 is on, the controller 810 can send an error signal to the user through the charging indicator and cause the actuator to move the charging plug 830 back to the frame of the charging station. Additionally, or alternatively, the controller 810 can turn off the power supply 840.

The electronic charging unit 820 can be configured to provide power to the vehicle until the vehicle is fully charged, to provide a specified amount of power to the vehicle, and/or to provide power for a specified period of time. If the electronic charging unit 820 is configured to provide power to the vehicle until the vehicle is fully charged, the controller 810 can determine that the vehicle has completed charging through the output of the charging sensor 880. In one embodiment, the controller 810 can continuously monitor the output of the charging sensor 880 to determine whether the vehicle is still being charged. Once the controller 810 determines the vehicle is finished charging, the controller 810 can cause the actuator 850 to move the charging plug 830 back into the frame of the charging station. Additionally, or alternatively, the controller 810 can turn off the power supply 840. In another embodiment, the controller 810 can periodically send a request to the charging sensor 880 to determine whether power is still being transferred to the vehicle. For example, the controller 810 can send a request to the charging sensor 880 every 5 seconds to request a charging status. In another embodiment, the charging sensor 880 can be configured to send the charging status to the controller 810 periodically. The charging sensor 880 can be configured to send periodic updates to the charging status to the controller 810 as long as the automated EV charging station is in operation, only when the charging plug 830 is electrically coupled to the vehicle, or for any other suitable time. In one embodiment, the charging sensor 880 is configured to send a signal to the controller 810 that the vehicle is charged.

The charging sensor 880 can be configured to measure the amount of power transferred to the vehicle and transmit that information to the controller 810. If the electronic charging unit 820 is configured to provide a certain amount of power to the vehicle, the charging sensor 880 can send the amount of transferred power to the controller 810 and the controller 810 can compare the amount of transferred power to the amount of requested power. Once the amount of transferred power reaches the amount of requested power, the controller 810 can turn off the power supply 840 and can cause the actuator 850 to move the charging plug 830 to return to the frame. Additionally, or alternatively, the controller 810 can be configured to determine the amount of transferred power. For example, the controller 810 could determine the amount of transferred power by measuring the amount of power output by the power supply 840 and accounting for electrical losses in the cord and the charging plug 830. Additionally, the controller 810 can monitor an input from the charging sensor 880 indicating power is being transferred and use that information with the amount of power output by the power supply 840 to determine the amount of transferred power.

If the electronic charging unit 820 is configured to charge the vehicle for a certain amount of time, the controller 810 can be configured to calculate the charging time for the vehicle. The controller 810 can include a timer in its circuitry or be connected to an external timer. Once the charging plug 830 is connected to the vehicle and the power supply 840 is on, the controller 810 can start the timer and can cause the actuator 850 to disconnect the charging plug 830 from the vehicle and/or turn off the power supply 840 once the timer reaches the requested charge time. Alternatively, the controller 810 can monitor an output of the charging sensor 880 to determine whether the vehicle is being charged. While the charging sensor 880 signals that the vehicle is being charged, the controller 810 can cause the timer to run and can cause the timer to stop when the charging sensor 880 signals that the vehicle is not being charged. Once the timer reaches the requested charge time, the controller 810 can cause the actuator 850 to electrically and/or physically disconnect the charging plug 830 from the vehicle and/or turn off the power supply 840.

In one embodiment, the electronic charging unit 820 can be configured to stop charging the vehicle in response to an indication from the occupant of the vehicle to stop charging. In response to receiving a stop signal from the occupant, the controller 810 can cause the actuator 850 to move the charging plug 830 back into the frame and/or turn off the power supply 840.

In one embodiment, the electronic charging unit 820 can be configured to stop charging the vehicle if the vehicle moves. The alignment sensor 870 can signal to the controller 810 that the vehicle is no longer in a charging position with respect to the frame. The controller 810 can then cause the actuator 850 to move the charging plug 830 away from the vehicle. The actuator 850 can further move the charging plug 830 back into the frame. The controller 810 can additionally turn off the power supply 840.

The electronic charging unit 820 can include one or more microcontrollers, microprocessors, and/or other programmable electronics that are programmed to carry out various functionality, including functionality that relates to the automated EV charging station as described herein. The electronic charging unit 820 can additionally or alternatively include other electronic components that are programmed to carry out the functions described herein, or that support the microcontrollers, microprocessors, and/or other electronics. The other electronic components can include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in another manner, whether combined into a single unit or distributed across multiple units. Such components can be physically distributed in different positions in the frame, or they can reside in a common location within the frame. When physically distributed, the components can communicate using any suitable communication protocol, for example Bluetooth.

FIG. 3 shows a top view of the automated EV charging station 100 of FIG. 1. The electronic charging unit 120 can be stored in the frame 110. As depicted in FIG. 3, the electronic charging unit 120 can be sealed within the frame 110 by a set of retractable doors 330. The retractable doors 330 can be electronically connected to the controller. The electronic charging unit 120 can be sealed within the frame by any other suitable means. When the actuator 150 acts to move the charging plug 130 out of the frame 110, the controller can send a signal to the set of retractable doors 330 to cause them to open to allow the charging plug 130 to exit the frame 110. When the actuator 150 acts to retract the charging plug 130 into the frame 110, the controller can send a signal to the set of retractable doors 330 to cause them to close thereby sealing the electronic charging unit in the frame 110. Alternatively, the set of retractable doors 330 can automatically open in response to the charging plug 130 coming within a certain distance of the set of retractable doors 330, for example, through the use of a proximity sensor. In another embodiment, the electronic charging unit 120 can be disposed in the frame 110 with no covering such that the actuator 150 can cause the charging plug 130 to exit the frame 110 without having to move any covering. The electronic charging unit 120 is shown disposed toward the rear portion of the automated EV charging station 100. However, the electronic charging unit 120 can be disposed in any suitable location of the frame 110.

As depicted in FIG. 3, the automated EV charging station 100 has two alignment sensors installed 172 along opposite edges of the frame 110. Both of the alignment sensors 172 can be electronically connected to the controller and configured to indicate whether the vehicle is aligned with the frame 110. For example, if the left alignment senor 172 detects the vehicle but the right alignment sensor 172 does not detect the vehicle, the controller can determine that the vehicle is not aligned with the frame 110 and communicate the misalignment to the alignment indicator 170. Additionally, or alternatively, the alignment or misalignment of the vehicle can be communicated directly to the alignment indicator 170 from the alignment sensors 172.

Figure 4:
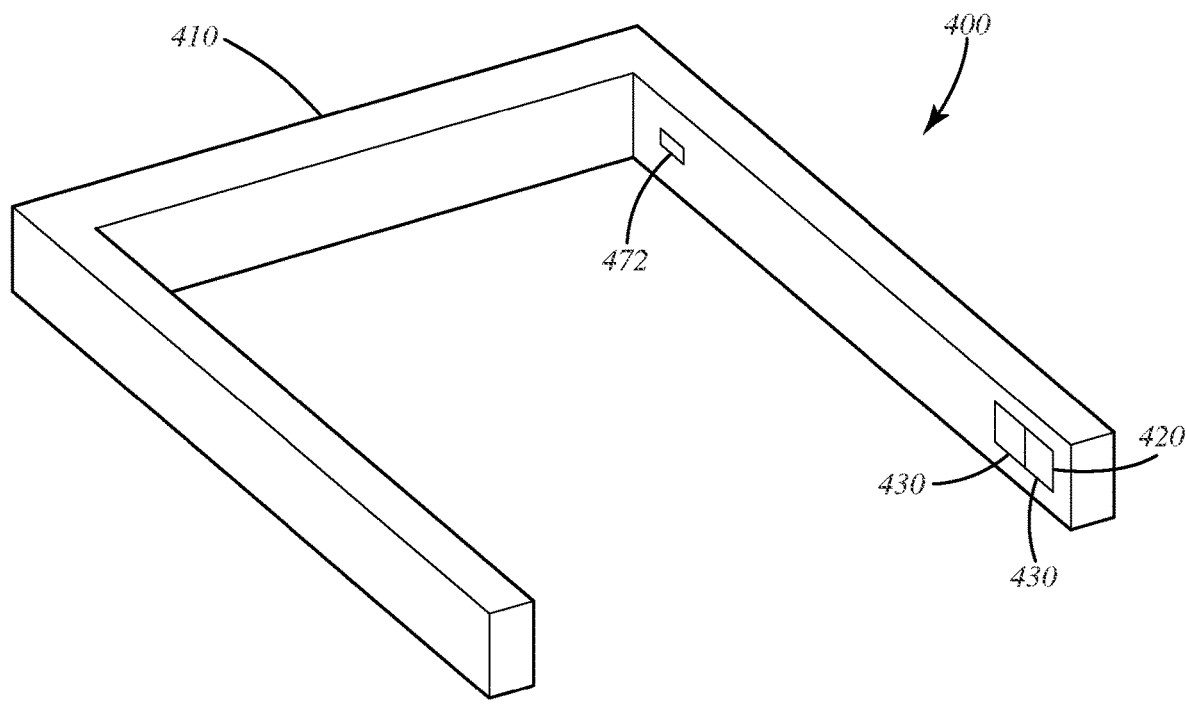
FIG. 4 is a perspective view of an automated electric vehicle charging system according to another embodiment.

In FIG. 4, an alternative embodiment of the automated EV charging system 400 is shown. As depicted, the frame 410 is U-shaped. A vehicle can enter the U-shape and park to receive an electric charge. The vehicle can either drive front on into the frame 410 or reverse into the frame 410. Alternatively, the frame 410 can be sized to fit fully beneath a vehicle such that a vehicle drives over and parks on top of the frame 410. When the vehicle is parked in proximity to the frame 410, the frame 410 is located at least partially beneath the vehicle. An electronic charging unit 420 can be disposed within the frame 410. As shown, the electronic charging unit 420 can be located toward the opening of the frame 410 with the opening through which the charging plug can be actuated facing toward the opening of the frame 410. The electronic charging unit 420 can be disposed in any suitable location in the frame 410 including, but not limited to, in the back edge of the frame 410. There can also be more than one electronic charging unit 420 installed in the frame 410, for example, there can be an electronic charging unit 420 on either side of the opening. Additionally, or alternatively, the opening associated with electronic charging unit 420 through which the charging plug 130 can be actuated is located on the upper surface of the frame 410 and/or the outer edge of the frame 410. As depicted, the electronic charging unit 420 is enclosed by a set of retractable doors 430. In alternative embodiments, the electronic charging unit 420 can be enclosed in the frame 410 through another suitable means or can be disposed in the frame 410 without being enclosed in the frame 410.

The frame 410 can also include an alignment sensor 472. The alignment sensor 472 can be installed in any suitable location in the frame 410. Additionally, or alternatively, the frame 410 can include more than one alignment sensor 472 disposed in suitable locations in the frame 410. The alignment sensor 472 can be electrically connected to the controller to signal whether the vehicle is in a charging location with respect to the frame 410.

Figure 5:
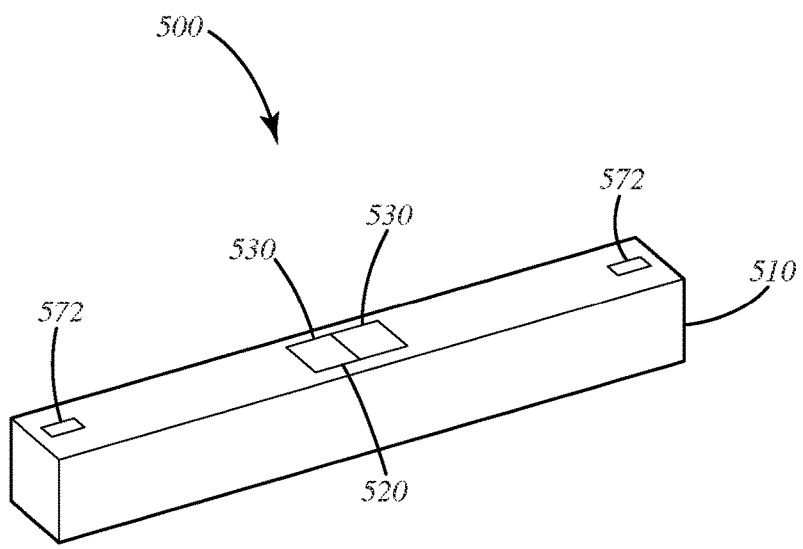
FIG. 5 is a perspective view of an automated electric vehicle charging system according to still another embodiment.

In FIG. 5, another alternative embodiment of an automated EV charging station 500 is shown. The automated EV charging station 500 includes a frame 510, an electronic charging unit 520 disposed in the frame 510, and a set of retractable doors 530 enclosing the electronic charging unit 520 in the frame 510. A vehicle can park in proximity to the frame 510 and a charging plug can be actuated out of the frame 510 to electrically couple to the vehicle to provide an electric charge to the vehicle. The vehicle can park alongside the frame 510 such that the frame 510 is disposed along the driver's side of the vehicle, the front of the vehicle, the passenger's side of the vehicle, or the rear of the vehicle. Regardless of the orientation of the frame 510 with respect to the vehicle, the frame 510 can be located at least partially beneath the vehicle. As depicted, the actuator 150 actuates the charging plug 130 out of the top surface of the frame 510. Additionally, or alternatively, the charging plug 130 can be actuated from any suitable surface of the frame 510.

The frame 510 can also include an alignment sensor 572. The alignment sensor 572 can be installed in any suitable location in the frame 510. As depicted in FIG. 5, the frame 510 can have more than one alignment sensor 572 installed. The alignment sensor 572 can be electrically connected to the controller to signal whether the vehicle is in a charging location with respect to the frame 510.

Figure 6:
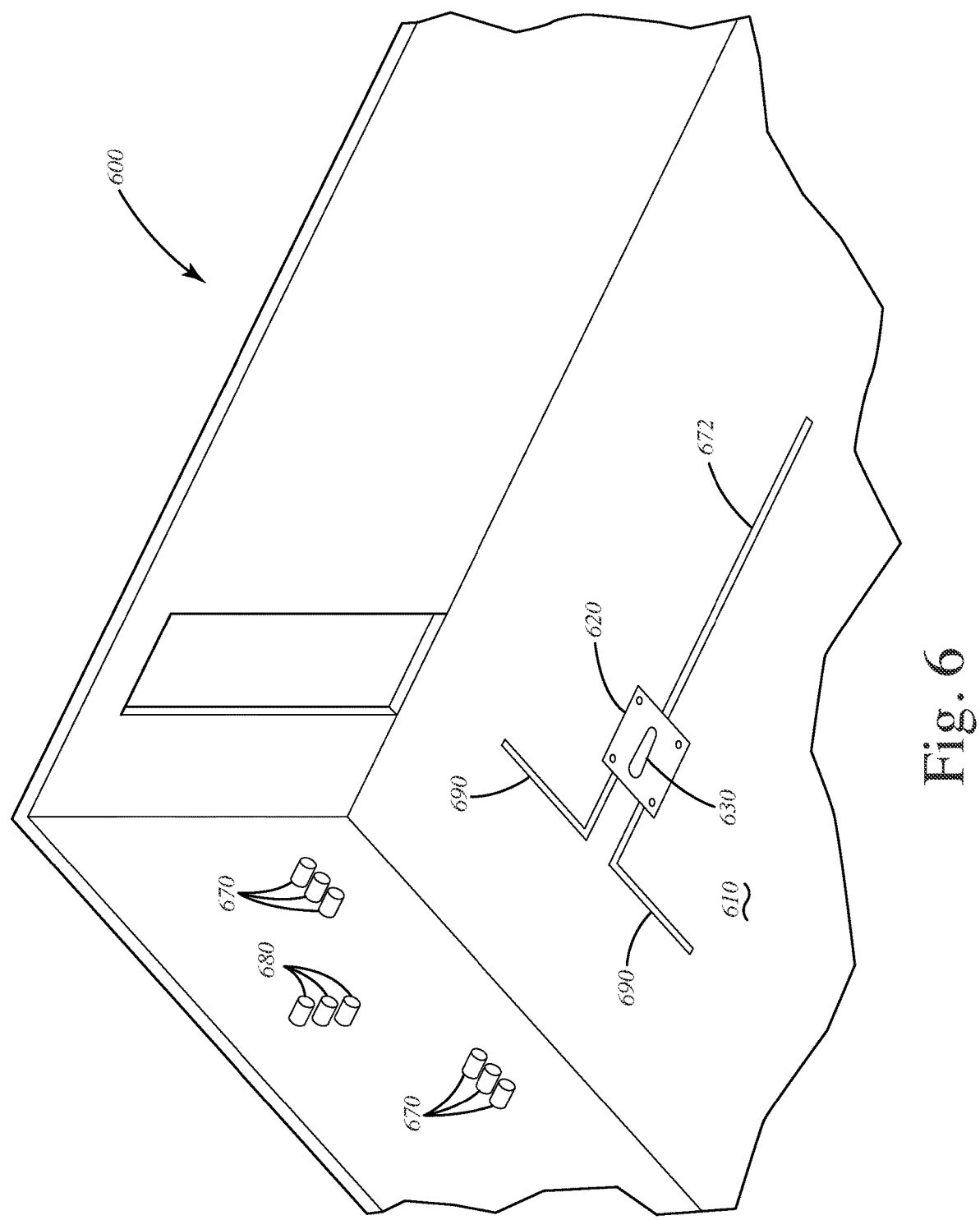
FIG. 6 is a perspective view of an automated electric vehicle charging system according to yet another embodiment.

In FIG. 6, another alternative embodiment of an automated EV charging station 600 is shown. As depicted, the automated EV charging station 600 includes a frame 610 which is located in a ground plane. In an alternative embodiment, the frame 610 can be a platform on which a vehicle can drive. The frame 610 can include an electronic charging unit 620. The electronic charging unit can include a power supply connected to a charging plug 630 which is connected to an actuator 650. The charging plug 630 can be electrically connected to a controller through a cord 640. The controller can be electrically connected to at least one alignment indicator 670, at least one charging indicator 680, two tire position sensors 690, and a center alignment sensor 672. As depicted, the automated EV charging station 600 can include two alignment sensors 670, one on the left and one on the right of the charging sensor 680.

The alignment indicator 670 and the charging indicator 680 can be physically connected to the controller through wires or can be wirelessly connected through any suitable protocol, such as Bluetooth. In one embodiment, the alignment indicator 670 and the charging indicator 680 can be installed in a wall in proximity to the frame 610. In another embodiment, the alignment indicator 670 and the charging indicator 680 can be installed on the surface of a wall in proximity to the frame 610. In yet another embodiment, the alignment indicator 670 and the charging indicator 680 can be installed on a stand-alone protrusion which can be placed in proximity to the frame 610.

A vehicle can park in proximity to the frame 610 in order to receive an electric charge. The alignment indicators 670 and the charging indicator 680 are located in a field of vision of an occupant of the vehicle and indicate a vehicle alignment status and a vehicle charging status. When a vehicle parks in proximity to the frame 610, the alignment indicators 670 indicate whether the vehicle is in a charging position. The vehicle is in a charging position when the front tires are aligned with the tire position sensors 690 and the center of the vehicle is aligned with the center alignment sensor 672. The tire position sensors 690 can also be known as front tire forward position sensors.

When the vehicle is in the charging position, the electronic charging unit 620 can determine a receiving location 660 on a vehicle where the vehicle is configured to receive an electric charge. The electronic charging unit 620 can cause the actuator 650 to move the charging plug 630 out of the frame 610 to electrically couple with the receiving location 660. In one embodiment, the receiving location 660 is a physical location on the vehicle, such as an electric socket or a contact wireless power receiver. In an alternative embodiment, the receiving location 660 is an electromagnetic field which the charging plug 630 can be actuated into to wirelessly charge the vehicle. When the desired amount of electric charge has been transferred to the vehicle, the actuator 650 can disconnect the charging plug 630 from the receiving location 660 and return the charging plug 630 to the frame 610.

In one embodiment, the automated EV charging station 600 as depicted in FIG. 6 can be disposed in a residence, for example, in a garage. In another embodiment, the automated EV charging station 600 as depicted in FIG. 6 can be disposed in a public space, for example, in a parking structure.

Figure 9:
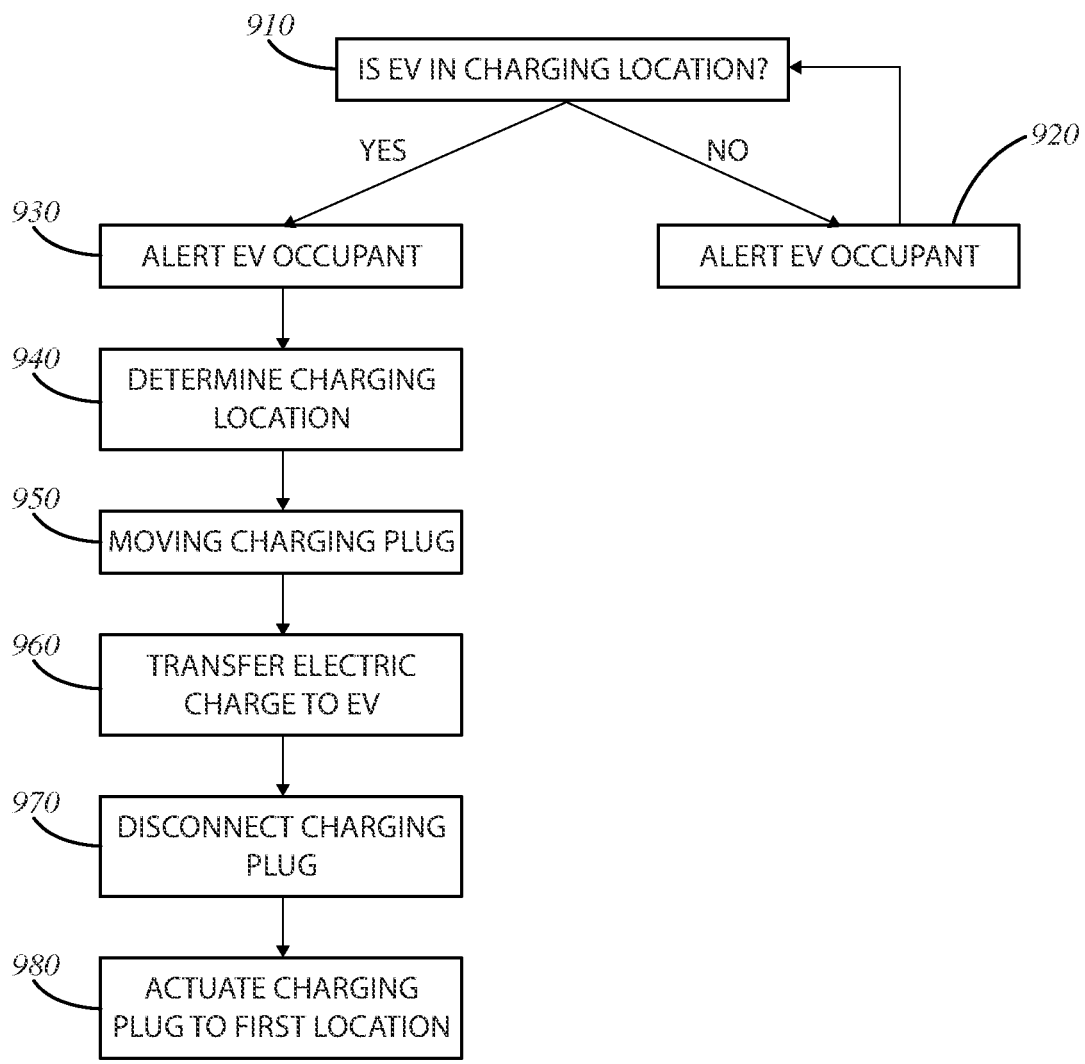
FIG. 9 is a control diagram for an automated electric vehicle charging system.

A method of charging an EV according to one embodiment is shown in FIG. 9. The automated EV charging station can determine whether the vehicle is aligned with the frame such that the vehicle is in a charging location. Step 910. Whether or not the vehicle is in the charging location, the automated EV charging station can alert the occupant of the vehicle of the vehicle alignment status. Steps 920, 930. If the vehicle is not in the charging location, the automated EV charging station can alert the occupant of the vehicle and then recheck whether the vehicle is in the charging location. Step 920. If the vehicle is in the charging location, the automated EV charging station can determine the receiving location of the vehicle where the vehicle can receive an electric charge after alerting the vehicle occupant that the vehicle is in the charging location. Step 940. The charging station can then move the charging plug from a location distal from the vehicle toward the vehicle to electrically couple to the vehicle at the receiving location. Step 950. Electric charge can be transferred to the vehicle through the electrical coupling between the charging plug and the vehicle. Step 960. The charging station can then automatically disconnect the charging plug from the vehicle. Step 970. Finally, the charging station can actuate the charging plug to its first location distal from the vehicle. Step 980.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. An electric vehicle charging system comprising:
   a frame;
   an electronic charging unit mounted relative to the frame, the electronic charging unit comprising:
      a power supply;
      a charging plug coupled to the power supply;
      an actuator;
      an alignment sensor;
      a charging sensor;
      a controller in electronic communication with the alignment sensor, the charging sensor, and the actuator, the controller configured to cause the actuator to move the charging plug relative to the frame and toward a vehicle parked in proximity to the frame;
   an alignment indicator positioned within a field of view of an occupant of the vehicle and in electronic communication with the alignment sensor, the alignment indicator being in electronic communication with the controller and configured to indicate, to the occupant while the occupant is in the vehicle, whether the vehicle is properly aligned with the frame to receive an electric charge such that the vehicle is in a charging position; and
   a charging indicator positioned within the field of view of an occupant of the vehicle and in electronic communication with the charging sensor, the charging indicator being in electronic communication with the controller and configured to indicate, to the occupant while the occupant is in the vehicle, a charging status of the vehicle;
   wherein the actuator moves the charging plug to establish a connection sufficient to charge the vehicle,
   wherein the vehicle receives an electric charge through the connection between the charging plug and the vehicle,
   wherein the actuator moves the charging plug to retract the charging plug away from the vehicle and to return the charging plug toward the frame after the vehicle receives the electric charge.

2. The electric vehicle charging system of claim 1, wherein the frame is a platform upon which the vehicle can drive and park to receive the electric charge.

3. The electric vehicle charging system of claim 1, wherein the frame includes a U-shape structure such that the vehicle can enter the U-shape structure and park to receive the electric charge.

4. The electric vehicle charging system of claim 1, wherein the frame comprises a ground plane and at least one protrusion extending from the ground plane, wherein the charging plug is removably stored in or below the ground plane.

5. The electric vehicle charging system of claim 1, wherein the controller determines a receiving location of a vehicle where the vehicle can receive an electric charge.

6. The electric vehicle charging system of claim 5, wherein the charging plug is selectively moveable via an armature joined with the frame to couple to the receiving location in response to a vehicle being located in the charging position.

7. The electric vehicle charging system of claim 5, wherein the charging plug is selectively moveable to couple to the receiving location after the controller determines the vehicle is in the charging location and in response to a command received from a user.

8. The electric vehicle charging system of claim 1, wherein the charging plug is actuated to couple with a socket associated with the vehicle to facilitate charging of the vehicle.

9. The electric vehicle charging system of claim 1, wherein the frame includes a platform upon which the vehicle is parked in the charging position, wherein the charging plug is mounted to a moveable armature that advances the charging plug toward a socket of the vehicle when the vehicle is in the charging position, wherein the alignment indicator and the charging indicator are positioned forward of a B pillar of the vehicle when the vehicle is in the charging position.

10. The electric vehicle charging system of claim 1, wherein the charging plug retracts from the vehicle when the vehicle is charged.

11. The electric vehicle charging system of claim 1, wherein the charging plug retracts from a vehicle in response to a command received from a user.

12. An electric vehicle charging system comprising:
a frame;
an electronic charging unit disposed at least partially in the frame, the electronic charging unit comprising:
 a power supply;
 a charging plug coupled to the power supply;
 an actuator;
 a sensor;
 a controller in electronic communication with the sensor and the actuator, the controller configured to cause the actuator to move the charging plug toward a vehicle; and
an alignment indicator positioned within a field of view of an occupant of the vehicle, the alignment indicator being in electronic communication with the controller and configured to indicate, to the occupant while the occupant is in the vehicle, whether the vehicle is properly aligned with the frame to receive an electric charge;
wherein the actuator moves the charging plug to establish an electrical connection with the vehicle,
wherein the vehicle receives an electric charge through the electrical connection between the charging plug and the vehicle,
wherein the actuator moves the charging plug to retract from the vehicle and to return to the frame.

13. The charging system of claim 12, wherein the frame includes a protrusion and the alignment indicator is positioned on the protrusion.

14. The charging system of claim 12 comprising:
a charging indicator located in the field of view of an occupant of a vehicle, the charging indicator being in electronic communication with the controller and indicating whether a vehicle is charging.

15. The charging system of claim 14, wherein the alignment indicator and the charging indicator comprise a combined indicator, and wherein the combined indicator communicates both a vehicle alignment status and a vehicle charging status.

16. The charging system of claim 12, wherein the alignment indicator indicates whether a vehicle is in the proper position to receive an electric charge through a user interface on a mobile device of the occupant.

17. The charging system of claim 12, wherein the actuator retracts the charging plug from the vehicle in response to the vehicle being fully charged.

18. The charging system of claim 12, wherein the actuator retracts the charging plug from the vehicle in response to a movement of the vehicle with respect to the frame.

19. The charging system of claim 12, wherein the frame is a platform that a vehicle can park in proximity to receive the electric charge, wherein the sensor includes a position sensor positioned in the platform, the position sensor being in electronic communication with the controller.

20. A method of charging an electric vehicle, the method comprising:
determining whether an electric vehicle is aligned with a frame such that the electric vehicle is in a charging location;
indicating whether the electric vehicle is in the charging location to an occupant of the vehicle, the occupant of the vehicle being located inside the vehicle;
determining a receiving location where the electric vehicle can receive an electric charge;
automatically moving a charging plug from a first location distal from the vehicle toward the vehicle to couple the charging plug with the receiving location;
transferring an electric charge through the coupling of the charging plug and the electric vehicle;
automatically disconnecting the charging plug from the receiving location; and
automatically returning the charging plug to the first location.

* * * * *